July 3, 1951  H. S. JANDUS  2,558,959
AUTOMOBILE HOOD LOCK ASSEMBLY
Filed Oct. 24, 1947  2 Sheets-Sheet 1

Inventor
HERBERT S. JANDUS
The Firm of Charles W. Hills
by  Attys.

July 3, 1951          H. S. JANDUS          2,558,959
AUTOMOBILE HOOD LOCK ASSEMBLY Filed Oct. 24, 1947          2 Sheets-Sheet 2

Inventor
HERBERT S. JANDUS
The Firm of Charles W. Hill
Attys.

Patented July 3, 1951

2,558,959

UNITED STATES PATENT OFFICE 2,558,959

AUTOMOBILE HOOD LOCK ASSEMBLY

Herbert S. Jandus, Detroit, Mich., assignor to Houdaille-Hershey Corporation, Detroit, Mich., a corporation of Michigan Application October 24, 1947, Serial No. 781,797

7 Claims. (Cl. 292—225)

This invention relates to an improved closure fastening device, and particularly to an improved latching device for effecting the securement of a hood of an automobile vehicle in a closed position with respect to the engine compartment.

While not limited thereto, this invention is particularly adaptable for use in latching "alligator" type hoods for automotive vehicles, i. e., hoods which are pivoted to the body of the vehicle about a horizontal axis located at the rear end of the hood. A hood latch constructed in accordance with this invention will effect the rigid securement of such hood in its closed position irrespective of variations in dimensions encountered in normal manufacturing practice or wear of the hood or its cooperating body parts. Furthermore, a hood latch embodying this invention may be manually released from a fully locked position only from the interior of the passenger compartment of the vehicle and such initial release renders a safety latch member effective which permits only a slight opening movement of the hood sufficient for the operator or a service attendant to insert his fingers under the hood to engage the safety latch and effect the complete release of the front end of the hood from the body portion of the vehicle.

Accordingly it is an object of this invention to provide an improved closure fastening device, characterized by the simplicity and ease of manufacture and assembly of its components, and by the convenience and reliability of its operation.

A particular object of this invention is to provide a latching mechanism for automobile hoods which may be conveniently adjusted to compensate for variation in dimensions of the hood and its cooperating body parts, or for wear of such parts, so as to attain and maintain a snug securement of the hood on the body portion of the vehicle, thereby eliminating the possibility of rattles or other forms of obnoxious vibrations developing.

A further object of this invention is to provide an automotive hood latching device comprising both primary and secondary latching elements, the primary latching element being effective to secure the hood in fully closed position and being operable to unlatch the hood by a control device located within the passenger compartment of the vehicle; the secondary latching device being effective to positively restrict the initial opening movement of the hood after release of the primary latching mechanism to eliminate the possibility of inadvertent opening of the hood by air currents while driving, and being manually operable to a full release position by the insertion of the fingers of the operator under the partially opened hood.

The specific nature of this invention, as well as other objects and advantages thereof, will clearly appear from the following detailed description of the annexed sheets of drawings which, by way of preferred example only, illustrate one embodiment of the invention.

Figure 1:
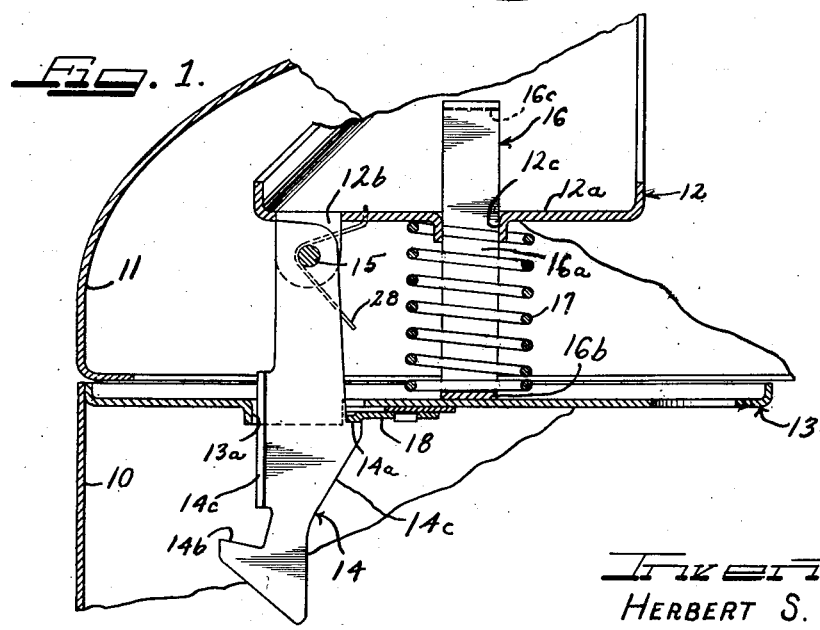
Figure 1 is a partial vertical sectional view taken through the front end of an automotive vehicle hood and showing the elements of a latching mechanism embodying this invention in locked position.

As previously indicated, this invention finds a particularly desirable application in effecting the fastening of the lid portion of an automotive vehicle hood to the fixed body portion of such vehicle. Thus, in Figure 1, a portion 10 of the auto body is shown which defines the engine enclosure, and a hood element 11 provides a top closure for such engine compartment. As is customary, the hood element 11 is pivotally secured to the vehicle body at a point near its rear end by any one of several well known forms of hood mountings (not shown). A top support bracket 12 having a generally horizontal base portion 12a is secured in any conventional manner, as by spot welding or riveting to the interior of hood element 11 near the front end thereof. Likewise, a bottom support element 13 of generally plate-like configuration is secured in a horizontal position to the top inside edge of the engine compartment side walls 10.

A pair of ears 12b are punched out of the base portion 12a of the top support 12 to define a pivotal mounting for a depending keeper element 14, which has the top end thereof pivotally mounted to ears 12b by means of a pin 15. Also, an aperture 12c is punched into the bottom wall 12a to slidably accommodate a striker spring guide element 16 which comprises a generally U-shaped member having vertical side wall portions 16a and a horizontal bottom wall portion 16b. The top ends of the vertical side wall portions 16a are deflected outwardly as indicated at 16c so as to prevent the guide element 16 from dropping through the aperture 12c. A striker spring 17 is supported within the striker spring guide 16 and is sufficiently extensible so as to normally urge the striker spring guide 16 downwardly to the full extent permitted by the stop ears 16c. The extent of such downward projection of the striker guide 16 and striker spring 17 is selected as to be substantially greater than the available clearance between the top support 12 and bottom plate 13 in the closed position of the hood 11. Hence, in such closed position, the striker spring guide 16 is moved upwardly with respect to support 12, compressing the spring 17 and thus maintaining a continual upward bias upon the movable hood part 11.

Figure 2:
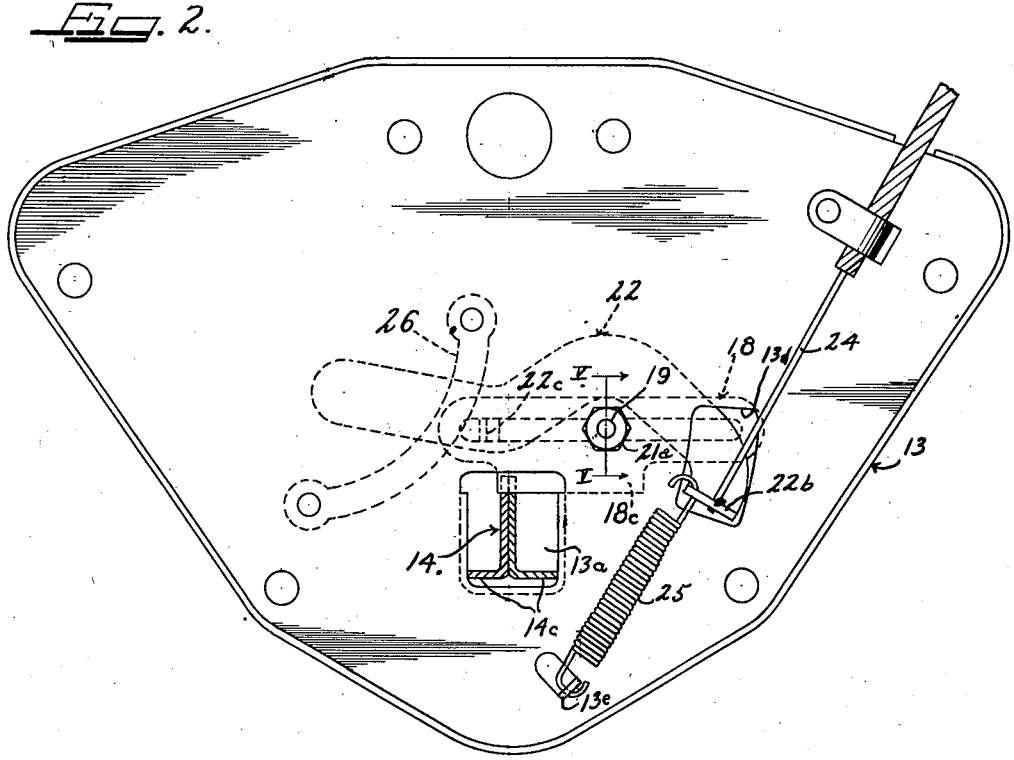
Figure 2 is a top plan view of the bottom plate assemblage of elements of a hood latch embodying this invention, showing however the latch keeper of the movable portion of the hood in section.
Figure 3:
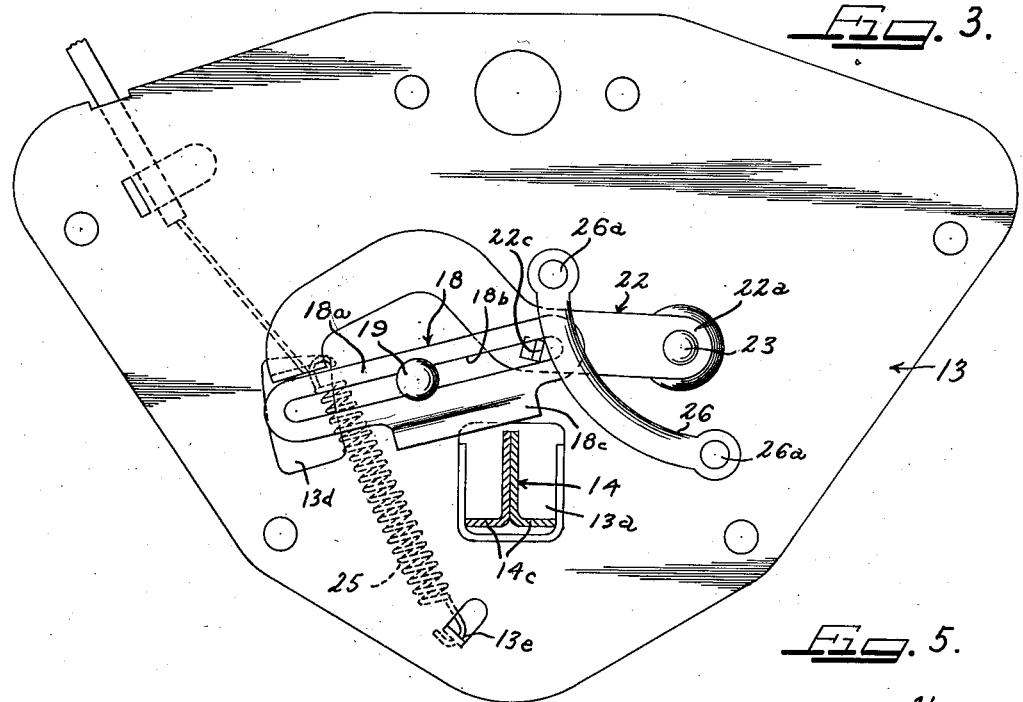
Figure 3 is a bottom plan view of the bottom plate assemblage.

A generally rectangular aperture 13a is provided in bottom plate 13 so as to permit the bottom portion of the keeper 14 to project through the bottom plate 13 in the closed position of hood 11. The bottom portion of keeper 14 is provided on its rear side with a primary latching or abutment surface 14a and on its front side, and near the lower end thereof, with a secondary or safety latching surface 14b. In addition, the central portion of keeper 14 is transversely enlarged, as indicated at 14c, so as to provide a convenient surface for engagement by the fingers of the operator in effecting the release of the keeper from its safety latching position. Hence, the keeper 14 may be conveniently formed by welded assemblage of two stampings, each stamping forming one-half of the complete keeper element as determined by a vertical plane of division, as best shown in Figures 2 and 3.

In the fully closed position of the hood 11, the primary latching surface 14a is disposed beneath but adjacent to the bottom of the support plate 13. A latch element 18 is then provided which is movably mounted on the support plate 13 and arranged to be manually controlled so as to move to and from a position of latching engagement with primary latching surface 14a of the keeper 14.

Figure 4:
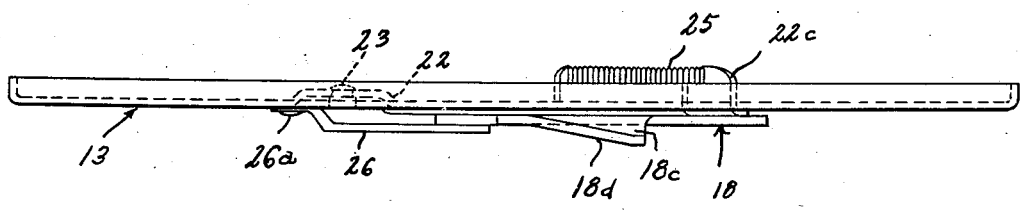
Figure 4 is a side elevational view of the bottom plate assemblage.

In accordance with this invention, the latch 18 comprises a member having an elongated body portion which defines an elongated slot 18b. Along one side of the body portion 18a, an integral projection 18c is provided, the bottom surface 18d of which cooperates with the primary abutment surface 14a in latching relationship. Preferably, the bottom surface 18d is inclined somewhat with respect to the horizontal in the manner best illustrated in Figure 4. If the vertical position of the latch 18 is fixed relative to plate 13 by having such latch abut against the bottom surface of plate 13, it is therefore apparent that the inclined cam surface 18d may effect a snug locking engagement with primary abutment surface 14a even though the vertical position of such abutment surface varies over a considerable range. Those skilled in the art will recognize that a substantial vertical variation in the position of abutment surface 14a may be expected in such latch assembly. In the first place, such assemblies are generally manufactured by stamping or similar large quantity production processes which necessarily involve a substantial variation in dimensions of the individual components. Furthermore, the vertical position of the abutment surface 14a depends upon the position of the movable hood element 11 with respect to the fixed hood side walls 10. The hood element 11 being a relatively massive piece of thin walled metal may obviously involve a substantial variation in contour. All of such variations in the relative vertical position of the keeper 14 with respect to the bottom plate 13 may be compensated for and a snug latching engagement nevertheless secured by properly positioning the inclined cam surface 18d of the latch 18 with respect to the keeper abutment surface 14a.

Figure 5:
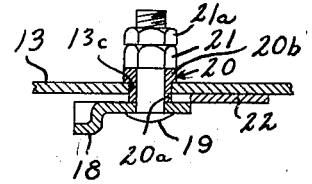
Figure 5 is an enlarged scale partial sectional view taken on the plane V—V of Figure 2.

In accordance with this invention, the elongated slot 18b provided in the body portion of the latch 18 is utilized to effect a selective position mounting of the latch 18 with respect to the bottom plate 13. As best shown in Figure 5, the mounting of the latch 18 is accomplished by a headed bolt 19 which is supported in a suitable hole 13c in bottom plate 13 and passes through the slot 18b of the latch. To effect the pivotal mounting of the latch 18 on the bolt 19 at any desired position of such bolt along the slot 18b, a retaining sleeve 20 is provided which is slipped over the shank portion of the bolt 19 and has a reduced diameter portion 20a which is rotatably insertable in the aperture 13c in the bottom supporting plate 13. An enlarged head portion 20b on the sleeve 20 prevents such sleeve from dropping through the aperture 13c. A nut 21 and lock nut 21a are then threaded upon the upwardly projecting end of bolt 19 and a rigid clamping of the latch 18 to the sleeve 20 is thereby effected. Hence the pivotal mounting point of the latch 18 may be selected at any point along the length of the slot 18b.

Such variations in the location of the pivotal mounting of the latch 18 will obviously produce a corresponding variation in the portion of the inclined cam surface 18d which is brought into overlying relationship with respect to the primary abutment surface 14a of the keeper 14. In the initial assembly of the latch, the pivotal position of the latch 18 may therefore be conveniently adjusted so as to produce a snug interengagement of the cam-like latching surface 18d with the keeper 14. Furthermore, after the vehicle is in service, it is quite common that the relative position of the keeper 14 with respect to the latch 18 will change substantially due to wear or deformation of the various supporting parts. Any such looseness, or equally well, any undesirable tightness of engagement, between the latch 18 and keeper 14 may be immediately removed by resetting the pivotal position of the latch 18 with respect to the pivot bolt 19.

Those skilled in the art will recognize that there is a variety of mechanism available for producing a manual shifting of the latch 18 about its pivot bolt 19 to obtain the locking and unlocking of the keeper 14. In application of the latch to the locking of an automotive vehicle hood, it is generally desired that the unlocking of the primary latch be capable of accomplishment only from the inside of the passenger compartment of the vehicle. This may be conveniently accomplished in accordance with this invention by the provision of an actuating lever 22 which has one end 22a pivotally mounted to the supporting plate 13 by a rivet 23. The other end of the actuating lever 22 has an upturned end portion 22b projecting through a suitable aperture 13d in bottom plate 13 and is secured in any conventional manner to an end of a control rod or wire 24 which extends to a suitable operating knob or lever (not shown)

mounted within the passenger compartment of the vehicle.

Since the actuating lever 22 is not concentrically mounted with respect to the latch 18, it is obvious that some form of pin and slot connection, or the equivalent, is required between actuating lever 22 and latch 18 in order that pivotal movements of the actuating lever will be converted into pivotal movements of the latch 18. Hence, the elongated slot 18b of the latching 18 is utilized for a second function in accomplishing the interconnection of the actuating lever 22 and the latch 18. An integral, depending projection 22c is formed on the actuating lever 22 and projects into the slot 18b. By virtue of such interconnection, clockwise pivotal movement of actuating lever 22 (as viewed in Figure 2) will produce counterclockwise pivotal movement of latch 18 to move the latch 18 into cooperative engagement with the keeper 14 while counterclockwise movement of the actuating lever 22 will obviously effect reverse movement of latch 18 to its unlocking position. To resiliently urge the latch 18 toward its locking position with respect to the keeper 14, a tension spring 25 is provided which has one hooked end secured to the upstanding end 22b of the actuating lever 22 and the other hooked end engaged by an integral upstanding projection 13e stamped from the bottom plate 13.

In some instances, it may be desirable to provide additional vertical support for the latch 18 and the actuating lever 22 and such may be provided by an arcuately shaped bracket 26 which is secured in depending relationship to the support plate 13 by rivets 26a and snugly underlies and supports the latch 18, which, in turn, provides vertical support for the actuating lever 22.

To provide a secondary, or safety latching function, the aperture 13a in bottom support plate 13, which receives the keeper 14, is suitably dimensioned with respect to the hook-like bottom end of the keeper 14 which defines the secondary latching surface 14b so as to be engaged by such latching surface as the hood 11 is raised following the release of primary latch 18 from primary abutment surface 14a. To insure that such engagement will occur, a spring 28 is provided which is mounted around keeper supporting pin 15 and operates between the keeper 14 and the top support bracket 12 to impart a clockwise pivotal bias to the keeper 14 which would insure that the secondary abutment surface 14b will always be raised in a path to intersect the front edge portion of the aperture 13a.

Hence, upon the release of the primary latch 18 by the manipulation of the appropriate knob or lever in the passenger compartment of the vehicle, the hood element 11 will be raised a short distance by the force of striker spring 17 until the secondary abutment surface 14b of the keeper engages the edge of bottom plate aperture 13a. The hood 11 is then positively locked against further opening movement and the locking action is completely out of control of any person located within the passenger compartment of the vehicle. There is, therefore, no possibility that the inadvertent release of the primary latch 18 while the vehicle is moving will produce a full opening of the hood 11 by virtue of the air currents acting thereon.

To release the keeper 14 from its safety latching position, it is only necessary that the fingers of the operator be inserted under the front edge of the partially opened hood element 11 and the keeper element 14 be manually moved in a counterclockwise direction sufficient to release the secondary abutment surface 14b from its locking engagement with the walls defining aperture 13a. Thereupon, the hood 11 may be fully opened to provide access to the engine compartment of the vehicle.

Prior to closing of the hood 11, the control knob (not shown) will, of course, have been released and the primary latch 18 returned to its latching position by the force of spring 25. As the hood element 11 is lowered to its closed position, the striker spring guide 16 contacts the bottom plate 13 and the downward movement of the hood 11 is cushioned by compression of striker spring 17. Concurrently, an inclined camming surface 14c formed on the rear side of keeper 14 engages the front edge of the latch 18 and cams such latch in a clockwise direction as viewed in Figure 2, to permit the keeper 14 to pass downwardly through the aperture 13a. Of course, in so doing, the keeper 14 acts as a centering guide to the downward movement of the hood 11. As soon as the primary abutment surface 14a passes into alignment with the cam-like latching surface 18d of the latch 18, the latch will immediately pivot into latching engagement therewith under the bias of the spring 25.

It is, therefore, apparent that the closure latching construction embodying this invention comprises components which are of extremely simple configuration and which may be economically manufactured and assembled. Furthermore, the feature of adjustably positioning the latch 18 with respect to the keeper 14 permits the convenient adjustment of the latch elements to compensate for variations in relative positions of the keeper and the latch so that the latch mechanism may, at any time, be adjusted to effect a snug securement of any two relatively movable parts of a closure.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. In combination with a pair of cooperating parts which are relatively movable along a fixed path between proximate and remote positions, a latch structure for securing said parts in said proximate position comprising a keeper secured to one of said parts, a latch having a body portion and a projecting latching surface engageable with said keeper, said body portion having an elongated slot, and means including a pin passing through said slot for pivotally mounting said latch to the other of said parts, said last mentioned means permitting the relative position of said latch with respect to said keeper to be selectively varied.

2. In combination with a pair of cooperating parts which are relatively movable along a fixed path between proximate and remote positions, a latch structure for securing said parts in said proximate position comprising a keeper secured to one of said parts, a latch having a body portion and a projecting latching surface engageable with said keeper, said body portion having an elongated slot, and means including a pin passing through said slot for pivotally mounting said latch to the other of said parts, said slot permitting the relative position of said latch with respect to said keeper to be selectively varied, an abutment surface on said keeper, said latching surface on said latch being engageable with said abutment surface to prevent relative movement of said parts, at least one of said surfaces being angularly disposed with respect to said path of movement, whereby the selective relative position of said keeper and latch provides adjustment of the relative positions of said parts in their proximate position.

3. In an automotive vehicle having a compartment and a cover movable along a fixed path between open and closed positions with respect to said compartment, the improvement comprising a support plate secured to said compartment, a pivot pin mounted on said plate, a latch member having an elongated slot receiving said pin, means for securing said latch for pivotal movement on said pin in any selected position of said pin along said slot, a keeper secured to said lid, an abutment surface on said keeper, and a latching surface on said latch engageable with said abutment surface to lock said cover to said compartment, at least one of said surfaces being angularly disposed with respect to said path of movement of said cover, whereby the selective relative position of said latch on said pin provides adjustment of the relative position of said cover with respect to said compartment in its closed position.

4. In an automotive vehicle having a compartment and a cover movable along a fixed path between open and closed positions with respect to said compartment, the improvement comprising a support plate secured to said compartment, a pivot pin mounted on said plate, a latch member having an elongated slot receiving said pin, means for securing said latch member for pivotal movement on said pin in any selected position of said pin along said slot, a keeper secured to said lid and having an abutment surface transversely disposed with respect to the path of movement of said cover, the latch having a portion thereof movable into engagement with said keeper abutment surface to lock said cover to said compartment, and a manually operable latch actuating member pivotally mounted on said plate, said actuating lever having a projection engaging said slot to thereby shift said latch to and from its keeper engaging position.

5. In combination with a pair of cooperating parts which are relatively movable along a fixed path between proximate and remote positions, a latch structure for securing said parts in said proximate position comprising a keeper secured to one of said parts, a latch having a body portion and a projecting latching surface engageable with said keeper, said body portion having an elongated slot, and means including a pin passing through said slot for pivotally mounting said latch to the other of said parts, said slot permitting the relative position of said latch with respect to said keeper to be selectively varied, and a manually movable actuating member having a projection engageable in said slot to thereby shift said latch to and from its keeper engaging position.

6. In a latch mechanism for association with a closure member and a cooperating member, a keeper mounted on one of said members and having a latching abutment, a latch on the other of said members having an elongated cam surface presenting an engaging surface of increasing elevation with respect to the other of said members and with respect to said latching abutment on said keeper from one end of said cam surface to the other, means pivotally mounting said latch on the other of said members, said means being selectively operable to position the pivotal axis of said latch into various positions relative to the latched position of said keeper abutment, for selectively effecting latching engagement of said abutment with different selected portions of said cam surface offset at different elevations with respect to said latching abutment of said keeper, and means for pivoting said latch out of latching engagement with said latching abutment of said keeper.

7. In combination with a pair of cooperating parts which are relatively movable along a fixed path between proximate and remote positions, a latch structure for securing said parts in said proximate position comprising a keeper secured to one of said parts, a latch pivotally secured to the other of said parts, said latch having a body portion and a projecting elongated latching surface spaced varying distances from the other of said parts along its length and being engageable with said keeper, said body portion having an elongated slot, a pin pivotally mounted in the other of said parts and passing through said slot, means securing said latch to said pin within said slot at various positions therealong to pivotally mount said latch to the other of said parts at various positions along said slot to selectively vary the position of said pin along said slot and the pivotal axis of said latch, to present surfaces of varying elevation with respect to said keeper for engagement therewith, and a manually movable actuating member having connection with said latch for shifting the latch about its pivotal axis.

HERBERT S. JANDUS.

REFERENCES CITED

The following references are of record in the file of this patent:

UNITED STATES PATENTS

| Number | Name | Date |
|---|---|---|
| 1,845,335 | Rosendahl | Feb. 16, 1932 |
| 2,270,053 | Hill et al. | Jan. 13, 1942 |
| 2,286,740 | Krause | June 16, 1942 |